United States Patent
Wildheim et al.

(10) Patent No.: US 11,649,556 B2
(45) Date of Patent: May 16, 2023

(54) ELECTROCHEMICAL CLEANING OF AN ADDITIVELY MANUFACTURED PART

(71) Applicant: Freemelt AB, Mölndal (SE)

(72) Inventors: Martin Wildheim, Mölndal (SE); Robin Stephansen, Mölndal (SE)

(73) Assignee: Freemelt AB, Mölndal (SE)

( * ) Notice: Subject to any disclaimer, the term of this patent is extended or adjusted under 35 U.S.C. 154(b) by 176 days.

(21) Appl. No.: 17/041,475

(22) PCT Filed: Mar. 26, 2019

(86) PCT No.: PCT/EP2019/057618
§ 371 (c)(1),
(2) Date: Sep. 25, 2020

(87) PCT Pub. No.: WO2019/185647
PCT Pub. Date: Oct. 3, 2019

(65) Prior Publication Data
US 2021/0010150 A1     Jan. 14, 2021

Related U.S. Application Data

(60) Provisional application No. 62/648,540, filed on Mar. 27, 2018.

(51) Int. Cl.
*C25F 1/00*     (2006.01)
*B33Y 40/20*    (2020.01)
(Continued)

(52) U.S. Cl.
CPC .................. *C25F 1/00* (2013.01); *B08B 3/08* (2013.01); *B22F 10/00* (2021.01); *B22F 10/62* (2021.01);
(Continued)

(58) Field of Classification Search
CPC ....................................................... B22F 10/62
See application file for complete search history.

(56) References Cited

U.S. PATENT DOCUMENTS

2009/0249949 A1\* 10/2009 Kepler ............... B01D 19/0036
                                                                95/44
2015/0144496 A1\*  5/2015 Morris .................... B22F 10/20
                                                               205/261
(Continued)

FOREIGN PATENT DOCUMENTS

EP         3 473 366 A1     4/2019
WO    WO-2017/029276 A1    2/2017
WO    WO-2017/087944 A1    5/2017

OTHER PUBLICATIONS

Rudnev, Valery Totten, George E.. (2014). ASM Handbook, vol. 4C—Induction Heating and Heat Treatment—49.3.2 Vacuum Chambers. ASM International. (Year: 2014).\*

*Primary Examiner* — Jophy S. Koshy
*Assistant Examiner* — Joshua S Carpenter
(74) *Attorney, Agent, or Firm* — Faegre Drinker Biddle & Reath LLP

(57) ABSTRACT

A method for removing powder from a component or part produced by metal additive manufacturing systems based on powder beds. The method includes manufacturing a part by additive manufacturing, the part having at least one internal cavity with at least one external opening. The internal cavity is at least partly filled with powder, the powder in the internal cavity having grains agglomerated or connected to each other. The method further including: evacuating gas from the internal cavity; adding liquid electrolyte to the internal cavity, and using an electrochemical process for separating connected powder grains in the cavity.

5 Claims, 4 Drawing Sheets

(51) Int. Cl.
  *B08B 3/08* (2006.01)
  *B22F 10/68* (2021.01)
  *B22F 10/62* (2021.01)
  *B33Y 10/00* (2015.01)
  *B22F 10/00* (2021.01)
  *B22F 10/28* (2021.01)

(52) U.S. Cl.
  CPC .............. *B22F 10/68* (2021.01); *B33Y 40/20* (2020.01); *B22F 10/28* (2021.01); *B33Y 10/00* (2014.12)

(56) References Cited

U.S. PATENT DOCUMENTS

| | | |
|---|---|---|
| 2015/0197862 A1 | 7/2015 | Engel et al. |
| 2019/0111507 A1* | 4/2019 | Lynch ................ B23H 7/26 |

* cited by examiner

ELECTROCHEMICAL CLEANING OF AN ADDITIVELY MANUFACTURED PART

CROSS-REFERENCE TO PRIOR APPLICATIONS

This application is a § 371 National Stage Application of PCT International Application No. PCT/EP2019/057618 filed Mar. 26, 2019, which claims priority to U.S. Provisional Application No. 62/648,540 filed on Mar. 27, 2018, both of which are incorporated herein in their entirety.

TECHNICAL FIELD

This invention relates to methods for removing remaining powder within internal channels, passages and cavities in components, and more particularly from components produced by a metal powder based additive manufacturing method.

DESCRIPTION OF RELATED ART

For example, gas turbine components are often designed with narrow, winding internal cooling cavities or channels. When such components are produced by 3D-printing or additive manufacturing, it could be difficult to remove remaining powder from inside such channels. During a 3D-printing process such as electron beam powder bed fusion, the powder surrounding the component being built will be semi-sintered, due to heating, and powder grains will be connected and joined to each other. Powder grains surrounding the component and inside the cavity could alternatively be joined together by a binder substance, such as in binder jetting technologies. Even if the powder grains inside a cavity are not physically stuck to each other, they may still be difficult to separate and remove. This is particularly true for powders of irregular grain shape trapped inside narrow channels.

Known methods for removing powder from internal channels are for example to use rotating tools and ultrasonic methods for separating the powder grains from each other and transport the powder out from the channel.

WO 2017029276(A1) discloses a method for additive manufacturing of a metal part having metal support structures and using a chemical process to remove the support structures.

SUMMARY OF THE INVENTION

This invention relates to a method comprising the steps:
Manufacture a part by additive manufacturing, said part having at least one internal cavity with at least one external opening, said at least one cavity at least partly filled with powder, said powder in the at least one cavity having grains connected to each other,
Evacuate gas from said at least one internal cavity,
Add liquid electrolyte to said at least one internal cavity,
Use an electrochemical process for removal of connections between powder grains in said at least one cavity.
In embodiments, the method comprises the step: Remove powder from said internal cavity after removal of connections between powder grains.
In embodiments, the method comprises the step: Evacuate said gas from said internal cavity by introducing said part in a vacuum chamber, wherein gas is evacuated from the vacuum chamber.

In embodiments, the method comprises the step: Add liquid electrolyte to said internal cavity by introducing liquid electrolyte into said vacuum chamber.

In embodiments, said powder is metal powder.

In embodiments, said powder grains are connected by semi-sintering.

In embodiments, at least one of the steps in said method is repeated to achieve a good result.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

In the description of the invention references is made to the following figures, in which.

Embodiments of the present disclosure and their advantages are best understood by referring to the detailed description that follows. It should be appreciated that like reference numerals are used to identify like elements illustrated in one or more of the figures.

DESCRIPTION AND DISCLOSURE OF THE INVENTION

Figure 1:
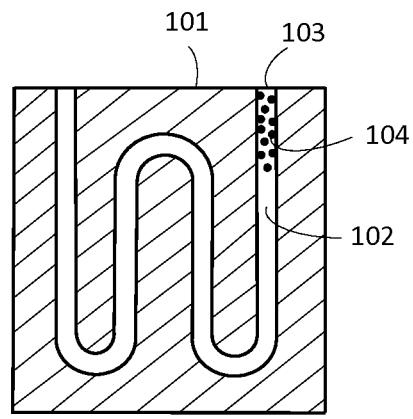
FIG. 1 shows, in schematic section view, a part having internal cavities at least partly filled with powder.

Powder refers to any type of granular material, regardless of size, shape and composition of the individual particles, or granules that are the constituents of the granular material.

Semi-sintered is a state in which powder grains are agglomerated or bound to each other to an extent where bonds can still be separated by mechanical methods. This is in contrast to a fully sintered state, in which the powder grains are joined by metallic bonds impossible to disintegrate back into separate powder grains in the original shape by mechanical methods.

The terms "manufacturing" and "build" refer in this context to the process of bonding powder particles together into a three-dimensional object in an additive manufacturing machine. The bonding can be carried out for example by fusion or sintering with an energy beam, or by adding a liquid binding agent. Thus, in this context, "manufacturing" and "build" do not imply that the three-dimensional object has reached its final state. The three-dimensional object may require one or several steps of further processing to reach a state where it is ready for its intended use.

The purpose of this invention is to provide a more efficient method for removing powder in internal cavities of a metal part or component produced by a powder based additive manufacturing method.

The powder used for this kind of manufacturing could comprise metal powder grains of different size and shape. During manufacturing of a component these metal powder grains are consolidated together to solid material. Powder surrounding the component being manufactured will often be semi-sintered either due to preheating of the powder bed, or the metal powder grains will be connected to each other due to processing heat from the adjacent component. Hence a powder grain inside a channel or a cavity will be joined together to other powder grains or to a wall of the component. The number of joints per particle could be from one to several. These joints could also be of different strength. Between the powder grains there will be gap volumes normally filled with air, another gas or vacuum after the 3D-printing is finished. There will also be gap volumes between semi-sintered powder grains and the walls of the cavity.

The semi-sintering of powder surrounding the built component is normally unwanted, but difficult to avoid, especially in narrow internal cavities remaining powder will unintentionally be semi-sintered and powder grains will be connected due to heat from the manufacturing process. To make it possible to remove the residue of powder inside these cavities it will be of great importance to remove as many connection joints between powder grains as possible. It is also desired to remove as many connections between powder grains and cavity walls as possible. Powder grains may also be connected to each other by shape, interlocking, geometry or friction between powder grains. In narrow cavities, powder grains may be connected to each other and also connected to the walls of the cavity and hence be difficult to remove from the cavity.

This invention is based on electrochemical methods for powder removal and particularly the understanding that the introduction of electrolyte liquid into a narrow channel or cavity of a part will be facilitated by previous evacuation of gas from the channel or cavity. When an internal cavity is partly filled with powder it is difficult to introduce a liquid into the cavity. Hence it is important to provide a method for facilitating the liquid electrolyte to fill up all empty space in the internal cavity. In an electrochemical process it is of great importance that all cavities and volumes surrounding the part being processed are filled with electrolyte. It is important to avoid gas pockets at the part being processed, since gas pockets will prevent the electrochemical process from being active due to lack of electrolyte in contact with the part. A typical electrolyte liquid does have high conductivity, chemical and electrochemical stability. For example, can water mixed with NaCl, NaNO3, Na2Cr2O7 or NaClO4 be used as electrolyte.

It is known that mechanical, ultrasonic and other methods can be used for removal of remaining powder from parts produced with additive manufacturing. It can be necessary to combine repeated treatment of the part by electrochemical and other methods for removing remaining powder to reach a good result. Other methods that can be used for removal of material and breaking bonds between powder grains are; electropolishing, electrochemical machining, etc.

Figure 2:
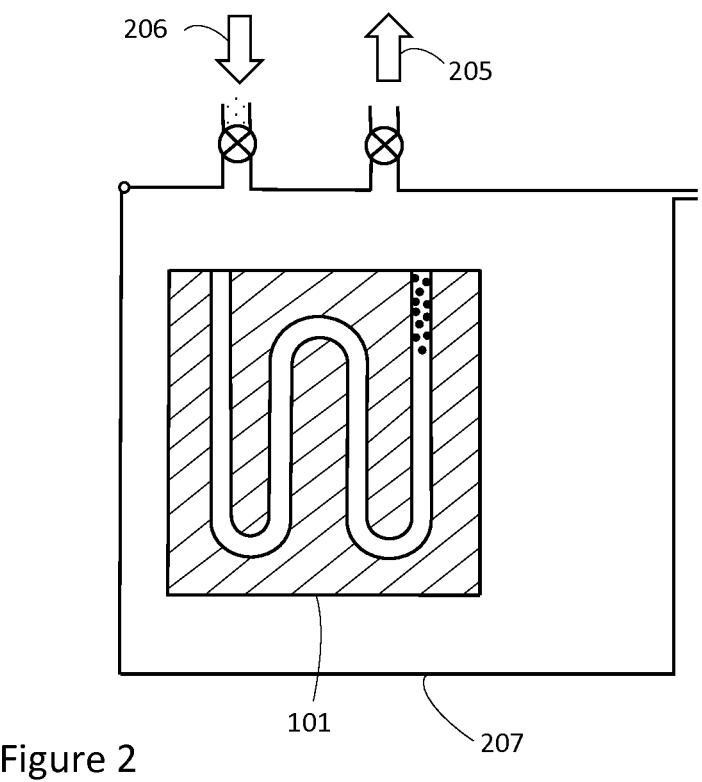
FIG. 2 shows, in schematic section view, a part introduced in a vacuum chamber.
Figure 3:
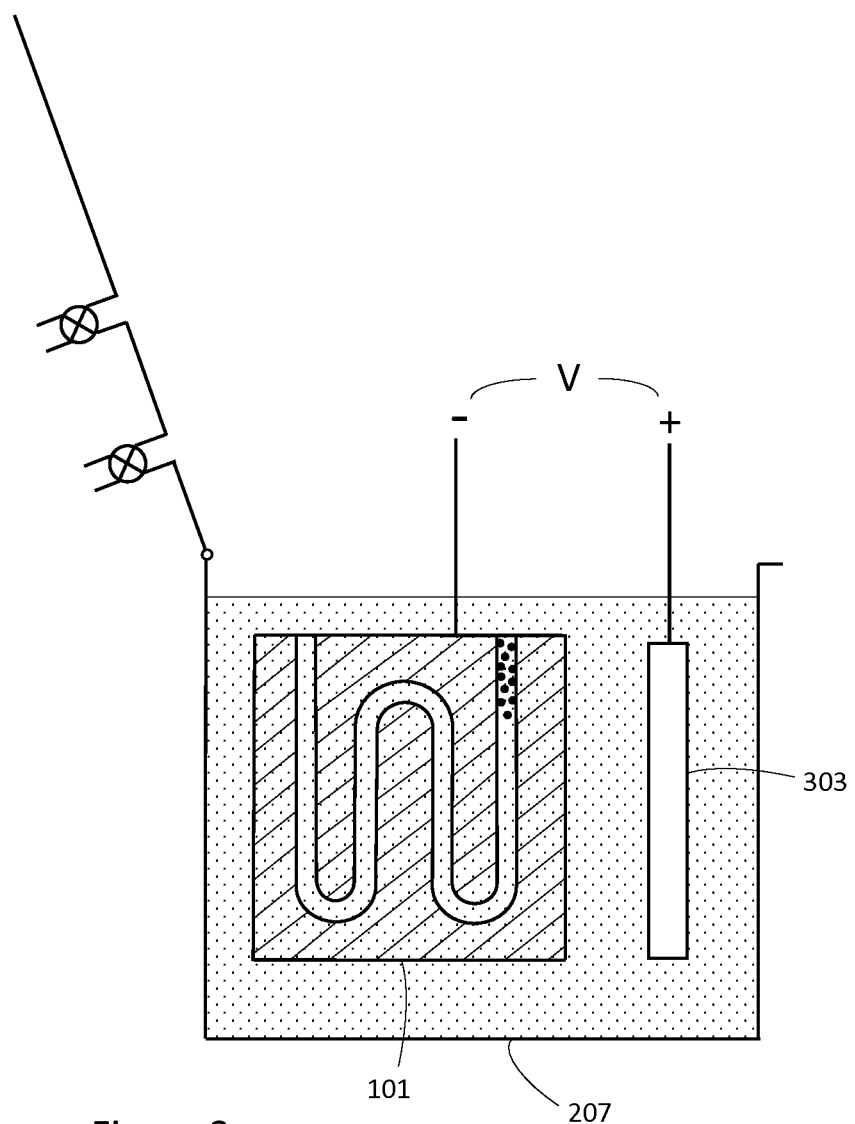
FIG. 3 shows, in schematic section view, a part in an electrochemical process.

An embodiment of this invention is shown in FIGS. 1, 2 and 3. A method is disclosed for a metal or component part 101, produced with additive manufacturing. The part 101 has at least one internal cavity 102, or channel, with at least one external opening 103. The cavity 102 is at least partly filled with powder 104 with grains connected together. A possibility for facilitating introduction of electrolyte into narrow cavities is to evacuate gas surrounding the powder 104 in the cavity 102 before adding the electrolyte. There are gap volumes between the powder grains or particles, gaps which could be evacuated from gas by a pump, fan or by means of a vacuum chamber. Typical pressure levels for the remaining gas after evacuation could be 0.99-0.1 bar or $0.1\text{-}10^{-2}$ bar or $10^{-2}\text{-}10^{-10}$ bar.

In the embodiment, the part 101 is introduced in a vacuum chamber 207 for evacuation of gas inside and surrounding the part. When the gas has been evacuated through a port 205, a liquid electrolyte is introduced in the vacuum chamber 207 through a port 206 for efficient filling of internal cavities 102 of the part 101. Since there is vacuum inside the cavity 102 before the fill up of electrolyte, there is no counterpressure and the electrolyte will penetrate easier into the cavity 102. The vacuum chamber 207 is subsequently ventilated to atmospheric pressure of air (or gas), creating a pressure difference between remaining unfilled gaps in the cavity 102, and the outside of the electrolyte being at atmospheric pressure. This pressure difference will effectively drive the electrolyte into the internal cavity 102 and all remaining unfilled gaps will thus be completely filled by the electrolyte 403.

When the vacuum chamber 207 has been filled, or partly filled with liquid electrolyte 403, shown in FIG. 3, the chamber 207 can be opened and there is a voltage V connected between the part 101 and a cathode 303 and an electrochemical process is performed on the part 101 for breaking of bonds and connections between powder grains and facilitating removal of powder 104.

Figure 4:
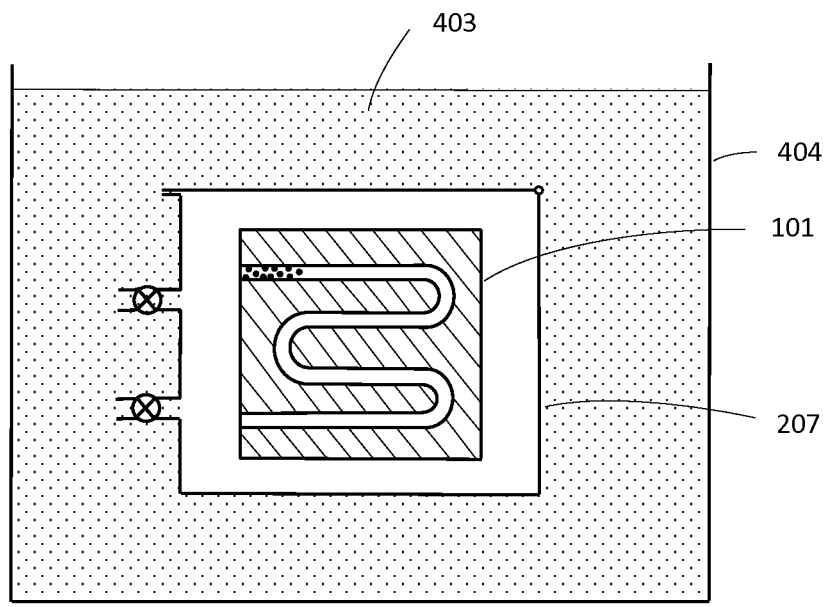
FIG. 4 shows, in schematic section view, a part inside a vacuum chamber lowered into a container with electrolyte.
Figure 5:
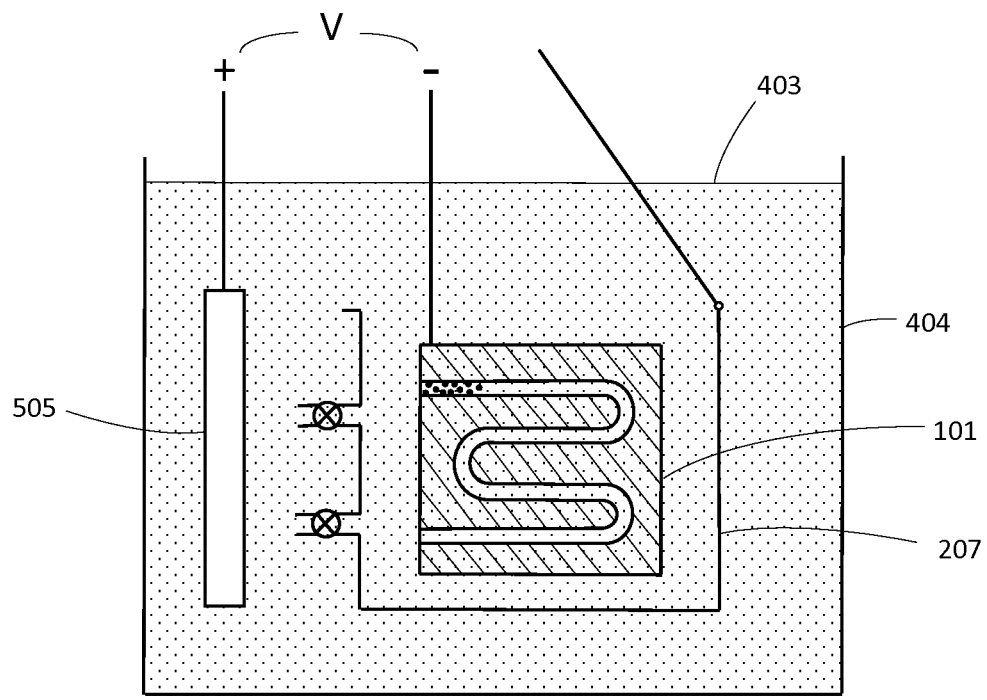
FIG. 5 shows, in schematic section view, a part in an electrochemical process.
Figure 6:
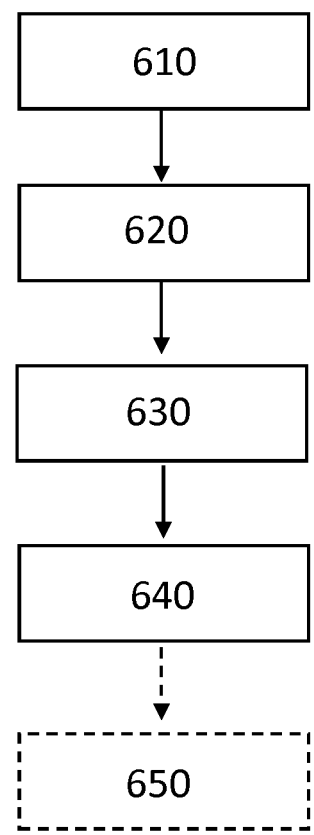
FIG. 6 shows, a block diagram over the steps in the method.

In another embodiment, shown in FIG. 4, the introduction of liquid electrolyte could be performed by lowering of the vacuum chamber 207 in a container 404 with electrolyte 403 and opening of the evacuated vacuum chamber 207 when it is surrounded by electrolyte 403, shown in FIG. 5. After electrolyte 403 has been introduced in the chamber 207 the part 101 will be surrounded by electrolyte 403 and air or gas has been prevented from entering the internal cavities 102. In a next step a voltage V is connected between the part 101 and a cathode 505 for starting of an electrochemical process for breaking of bonds between powder grains in the part 101.

In the electrochemical process of the described embodiment the chemicals are chosen depending on material in the part 101 and powder 104. Different chemicals and process settings can be used depending on the material and powder 104 that need to be removed. Stirring of the electrolyte 403 or pumping the electrolyte 403 back and forth through cavities 102 may be necessary to get a good electrochemical process. After the electrochemical process is finished there will often be powder 104 remaining inside the internal cavities 102. This remaining powder 104 can be removed in different ways, for example by using; compressed air, pressurised liquid, mechanical tools, blasting, ultrasonic vibration or other suitable methods for removal of powder 104. To achieve a good result, it is also possible to repeat the steps of the embodiment several times. This means that after the part 101 has been evacuated and filled with electrolyte 403 and thereafter electrochemically processed, loose powder is removed and if necessary, this can be repeated one or several times by again filling the part 101 with electrolyte 403 and perform the electrochemical process and remove powder 104.

The object of this invention is to provide a method for removing sintered powder from internal cavities of a part or component produced by additive manufacturing. This object is achieved by the method defined in the independent claim. The dependent claims contain advantageous embodiments, variants and further developments of the invention.

What is claimed is:

1. A method comprising:
manufacturing a part by additive manufacturing, said part having at least one internal cavity with at least one external opening, said at least one internal cavity at least partly filled with powder, said powder in the at least one internal cavity having grains connected to each other;
introducing said part in a vacuum chamber, and evacuating gas from said at least one internal cavity by evacuating gas from the vacuum chamber;
after said evacuating gas step, adding liquid electrolyte to said at least one internal cavity by introducing liquid electrolyte into said vacuum chamber while there is vacuum in the at least one internal cavity; and
using an electrochemical process for removal of connections between powder grains in said at least one internal cavity.

2. The method according to claim 1, further comprising removing powder from said internal cavity after removal of connections between powder grains.

3. The method according to claim 1, wherein said powder is metal powder.

4. The method according to claim 1, wherein said powder grains are connected by semi-sintering.

5. The method according to claim 1, wherein at least one of the steps in said method is repeated.

\* \* \* \* \*